No. 777,145.

Patented December 13, 1904.

UNITED STATES PATENT OFFICE.

CARL RUBITSCHUNG, OF FRANKFORT-ON-THE-MAIN, GERMANY.

MANUFACTURE OF ARTIFICIAL STONE.

SPECIFICATION forming part of Letters Patent No. 777,145, dated December 13, 1904.

Application filed May 8, 1903. Serial No. 156,281. (No model.)

*To all whom it may concern:*

Be it known that I, CARL RUBITSCHUNG, a subject of the German Emperor, residing at Frankfort-on-the-Main, Germany, have invented certain new and useful Improvements in the Manufacture of Artificial Stone, of which the following is a specification.

This invention relates to improvements in the manufacture of artificial stone.

The method of manufacturing hard artificial stone by mixing and subsequently pressing in molds divided stony material and tar which have previously been separately heated is known. With this method the value of the product principally depends, on one hand, on the use of the proper proportions of filling material and tar, the percentage of the former being as high as possible, five to ten times the weight of the tar, and, on the other hand, on using tar of the proper consistency, so that the said tar is able to take up large quantities of filling material and provide the necessary adhesive strength for the same. The practical employment of this method on a large scale has disclosed an important drawback, which consists in the fact that it is very difficult to uniformly compress large quantities of the mixture in a set of molds, since if the later charges are subjected to the same pressure as the earlier ones the molds are liable to break. The cause of this fact, which was long unexplained, is that the mixture in the mixing apparatus gradually and almost imperceptibly cools, and thus loses plasticity and compressibility. In order to obtain uniformity with large batches, it is necessary to charge the molds with a uniform material, so that the decreased plasticity and compressibility ultimately has the effect mentioned. To avoid this effect in my improved method, the divided stone material is heated in a separate apparatus to a considerably higher degree than the tar—for instance, to 200° or 300° centigrade or more—so that it becomes completely dry. The tar, on the other hand, is after being freed from ammonia liquor heated to a temperature below that of approximately 160° to 180° centigrade, which it is desired that the mixture should have. The heating of the two materials takes place in separate vessels, from which they continuously flow or are moved to the mixing apparatus in the desired proportions. During the mixing the hotter particles of stone powerfully absorb the hot liquid tar, and by this means and by the thin film of tar with which they become coated are particularly well fitted to cohere to the surrounding particles of stone. The hotter stone also contributes heat to the tar during the progress of the process of mixing and brings it to the temperature required for its most beneficial action. By this means without overheating the tar at any time the period at which the tar reaches the heat desired for it is removed from the period antecedent to the mixing and occurs during the mixing—that is to say, it is nearer to the period of delivery to the mold. The mass is continuously and automatically fed to the molds by the mixing apparatus in proportion as it is formed, so that uniform mixing proportions, charges, and temperature are insured, and consequently uniform moldings.

I declare that what I claim is—

The process of manufacturing molded artificial stone consisting in separately heating divided stony matter to a temperature above 180° centigrade and tar to a temperature equivalently below 150° centigrade, feeding said stony material and tar together in their respectively-heated states in definite proportions, mixing same, whereby the hotter stone imparts heat to the tar and continues the distillation thereof, feeding the product proportionately as it is formed to molds and compressing same therein.

In witness whereof I have signed this specification in the presence of two witnesses.

CARL RUBITSCHUNG.

Witnesses:
JEAN GRUND,
CARL GRUND.